United States Patent
Takada et al.

(10) Patent No.: US 7,697,816 B2
(45) Date of Patent: Apr. 13, 2010

(54) CIRCULATING MEMORY APPARATUS AND IMAGE STORAGE DISTRIBUTION SYSTEM

(75) Inventors: Tomomi Takada, Kodaira (JP); Seiichi Hirai, Koshigaya (JP); Hirotada Ueda, Kokubunji (JP)

(73) Assignee: Hitachi Kokusai Electric, Inc., Tokyo (JP)

( * ) Notice: Subject to any disclaimer, the term of this patent is extended or adjusted under 35 U.S.C. 154(b) by 1027 days.

(21) Appl. No.: 10/852,120

(22) Filed: May 25, 2004

(65) Prior Publication Data

US 2004/0244055 A1 Dec. 2, 2004

(30) Foreign Application Priority Data

May 29, 2003 (JP) ............................. 2003-152539

(51) Int. Cl.
  H04N 5/76 (2006.01)
  H04N 7/00 (2006.01)
  H04N 9/47 (2006.01)
(52) U.S. Cl. ........................................ 386/46; 348/143
(58) Field of Classification Search .................. 386/52; 711/110–112; 709/231; 710/6; 725/88; 345/558; 370/389
See application file for complete search history.

(56) References Cited

U.S. PATENT DOCUMENTS

| | | | | |
|---|---|---|---|---|
| 5,414,455 A * | 5/1995 | Hooper et al. ................ 725/88 |
| 5,583,561 A * | 12/1996 | Baker et al. .................... 725/93 |
| 5,926,649 A * | 7/1999 | Ma et al. ........................ 710/6 |
| 6,009,236 A * | 12/1999 | Mishima et al. ............. 386/111 |
| 6,078,988 A * | 6/2000 | Komori ....................... 711/112 |
| 6,101,547 A * | 8/2000 | Mukherjee et al. .......... 709/231 |
| 6,151,660 A | 11/2000 | Aoki |
| 6,222,841 B1 * | 4/2001 | Taniguchi ................... 370/389 |
| 6,314,466 B1 * | 11/2001 | Agarwal et al. ............. 709/231 |
| 6,353,702 B1 * | 3/2002 | Ando et al. .................... 386/95 |
| 6,636,941 B1 * | 10/2003 | Gold et al. ................... 711/112 |
| 6,907,081 B2 * | 6/2005 | Mantchala et al. ...... 375/240.26 |
| 6,999,090 B2 * | 2/2006 | Obata et al. ................. 345/558 |
| 7,076,560 B1 * | 7/2006 | Lango et al. ................. 709/231 |
| 7,139,869 B2 * | 11/2006 | Parry et al. .................. 711/110 |
| 7,146,458 B2 * | 12/2006 | Smirnov et al. ............. 711/110 |

FOREIGN PATENT DOCUMENTS

| | | |
|---|---|---|
| JP | 746522 | 2/1995 |
| JP | 11-232842 | 8/1999 |
| JP | 11261964 | 9/1999 |
| JP | 20016270 | 1/2001 |
| JP | 2001189911 | 7/2001 |
| JP | 2001245226 | 9/2001 |

* cited by examiner

*Primary Examiner*—Thai Tran
*Assistant Examiner*—Gelek Topgyal
(74) *Attorney, Agent, or Firm*—Brundidge & Stanger, P.C.

(57) ABSTRACT

A circulating memory apparatus and a data storage and distribution system using a circulating recording area effectively and having an improved access efficiency to the circulating recording area are disclosed. A memory area secured in a disk unit is used in circulation thereby to record the time series input data. The time series input data are edited into a data block of a predetermined size including a plurality of subblocks, and written into the disk unit by data block. In response to a request for outputting specific data, the data are read by subblock from the disk unit into a cache memory thereby to selectively output the specific data contained in the subblocks.

11 Claims, 7 Drawing Sheets

CIRCULATING MEMORY APPARATUS AND IMAGE STORAGE DISTRIBUTION SYSTEM

BACKGROUND OF THE INVENTION

1. Field of the Invention

The present invention relates to a circulating memory apparatus and an image storage and distribution system suitable for storing time series data, or in particular to a circulating memory apparatus and an image storage and distribution system suitable for storing a plurality of series of image data.

2. Description of the Related Art

In a remote monitor system, image data picked up sequentially by image pickup devices such as Web cameras, i.e. image data input in time series from a plurality of sites are stored (recorded or held) in a magnetic disk (such as a hard disk), an optical disk or a semiconductor disk or the like large-capacity recording device, while at the same time distributing the images through a network, so that they can be monitored on the monitor screen at a remote place.

The image data recording device is limited in capacity. The monitor system of this type, therefore, employs a circulating recording method, in which the memory area secured in the recording device is used in circulation and the oldest image data in time series are rewritten sequentially by the latest image data. This method makes it possible to hold and reproduce a predetermined amount of past image data. Several well-known techniques are available to manage the memory addresses in the circulating memory apparatus of this type. The technique disclosed in JP-A-11-232842 (FIGS. 1 to 12) is an example.

SUMMARY OF THE INVENTION

In storing time series data such as an image or a voice in a recording device, the input data (image frame) is recorded in the form compressed by the image compression scheme such as JPEG. The data size of the compressed image frames is varied from one frame to another according to the image status, and the method of handling, i.e. writing the data blocks in the recording device poses a problem.

As an example, a method is available in which the data block size is set at the upper limit (say, about 64 Kbytes) of the compressed image frame and the image data are written in the recording device by image frame. According to this method, however, an image frame of high compression rate (say, 10 Kbytes in frame size) develops a vacancy (54 Kbytes=64 Kbytes−10 Kbytes) in size, resulting in a reduced utilization rate of the disk recording area of the recording device. The write operation by image frame also increases the frequency of access to the recording device. An attempt to secure a plurality of circulating recording areas in the same recording device and record the image data from a plurality of sites in the same recording device, therefore, would cause a delayed response of the recording device due to the increased access frequency.

In the case where the compressed image data blocks for N frames (N: natural number) of fixed length stored in time series are written collectively in a recording device as a large data block, the frequency of access to the recording device can be greatly reduced as compared with the aforementioned case in which the write operation is performed by frame. Even in this case, however, a vacant area is generated in each frame of the data block due to variations in compression rate, and therefore the utilization rate of the disk recording area of the recording device is not improved. Also, an image data block, if read from the recording device for image reproduction, has vacant areas dispersed over the frames, and therefore the number of reproducible frames is small for the data length read from the recording device. Thus, the problem of the low efficiency of access to the recording device still remains unsolved.

An object of this invention is to provide a circulating memory apparatus and an image data storage and distribution system for utilizing the circulating recording area effectively and improving the efficiency of access to the circulating recording area.

Another object of this invention is to provide a circulating memory apparatus and an image data storage and distribution system suitable especially for storing the time series data from a plurality of sites.

Still another object of this invention is to provide a circulating memory apparatus and an image data storage and distribution system suitable especially for storing and distributing a plurality of series of compressed image data.

In order to achieve the objects described above, according to an aspect of this invention, there is provided a circulating memory apparatus comprising for recording the time series input data using in circulation the memory area secured in a recording device, comprising:

first means for editing the time series input data into data blocks of predetermined size including a plurality of subblocks and writing in the recording device by data block; and second means for reading the data into a cache memory by subblock from the recording device in response to an output request for specific data and selectively outputting the specified data included in the subblocks.

According to this aspect of the invention, a structure is formed in which each of the subblocks is formed to the size of an integer multiple of the size of the sectors making up the memory area of the recording device, for example, a plurality of units of time series data are recorded following the header portion, and only the tail end fraction has a vacant area. In this way, the proportion of the vacant area which otherwise might cause a wasteful access can be reduced in both the data blocks constituting units of the write operation into the recording device and the subblocks constituting units of the read operation.

Also, in view of the fact the data are read from the recording device for each subblock shorter than the unit of the write operation, the efficiency of accessing the recording device in response to a request for outputting those of the time series data selected at random or discretely can be improved. Incidentally, in response to an request for outputting the sequentially selected ones in the time series data, the read operation is performed by data block instead of by subblock.

According to another aspect of the invention, there is provided a circulating memory apparatus, wherein the first means includes a write cache memory for storing and editing the time series input data into data blocks of a predetermined size, and wherein the second means reads out the data by subblock from the recording device in the absence of the intended data in the cache memory and the write cache memory.

According to still another aspect of the invention, there is provided an image storage and distribution system, comprising:

a recording device connected to a plurality of image pickup devices and at least one client device through a network and having a plurality of circulating recording areas for storing the image data in time series in accordance with the channel number assigned to each of the image pickup devices;

first means for editing the image frames received in time series from the image pickup devices into data blocks of predetermined size each including a plurality of subblocks and writing the image frames by data block into the circulating recording area corresponding to the channel number of each image pickup device; and second means for reading the image data including the required image frame by subblock into the cache memory area from a specific circulating recording area corresponding to the channel number of the recording device in response to an image frame transmitting request from the client device of a designated channel number and extracting and transmitting the required image frame from the particular subblock to the client device.

According to yet another aspect of the invention, there is provided an image storage and distribution system, wherein the second means selects one of an image read mode for reading the image by subblock including the required image frame in accordance with the image reproduction mode of the client device and an image read mode for reading the image by data block including the required image frame, so that the image data are read into the cache memory area from the circulating recording area.

According to a further aspect of the invention, there is provided an image storage and storage system, wherein the first means has a plurality of write cache memory areas for storing the image frames received in time series from each image pickup device and editing the image frames into data blocks of predetermined size, and wherein the second means reads the image data from the recording device in the absence of the required image frame in the cache memory area and the write cache memory area.

The above and other objects, features and advantages will be made apparent by the detailed description taken in conjunction with the accompanying drawings.

DESCRIPTION OF THE EMBODIMENTS

Embodiments of the invention are described below with reference to the accompanying drawings.

Figure 1:
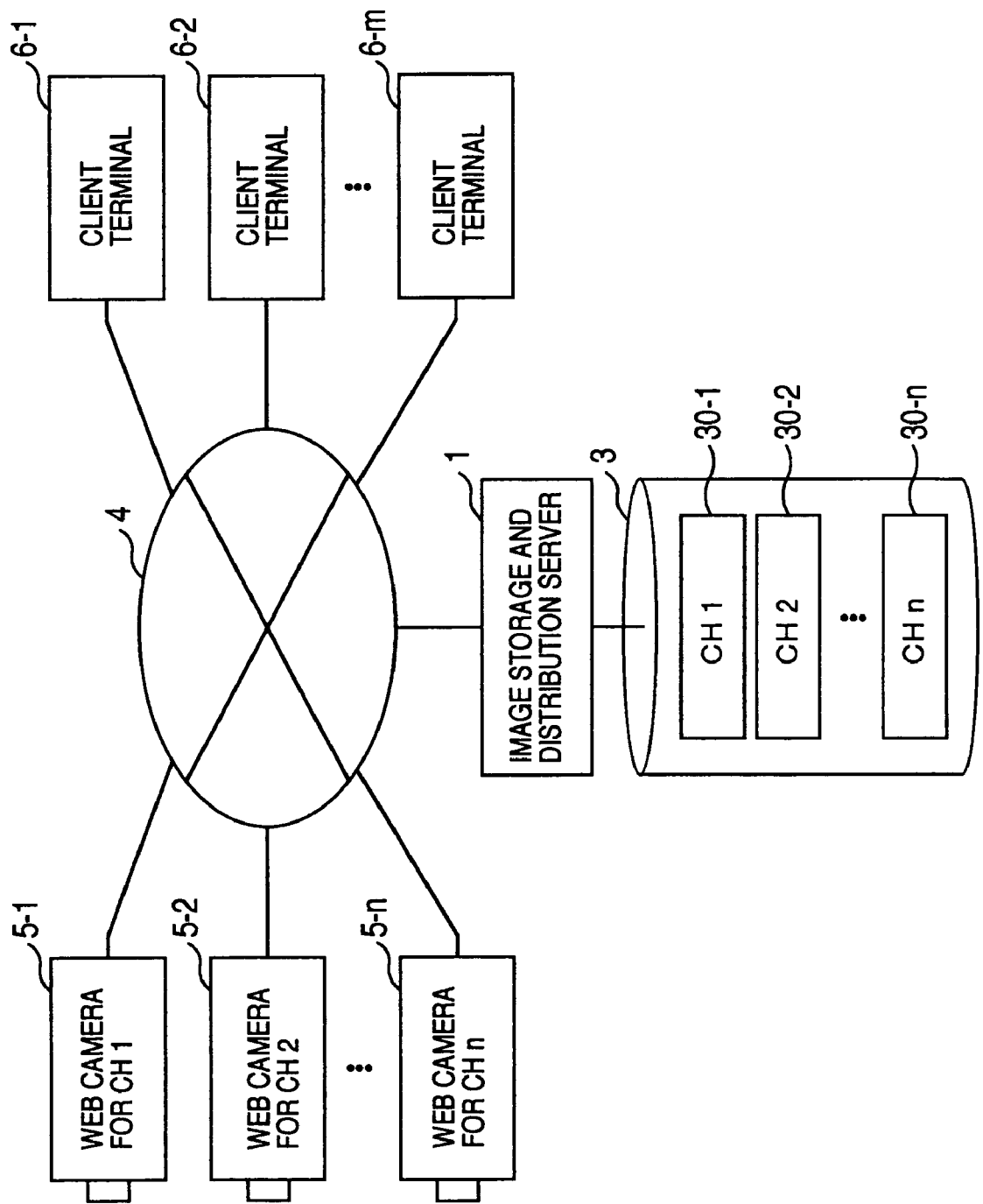
FIG. 1 is a diagram showing a general configuration of an image storage and distribution system according to this invention.

FIG. 1 is shows an example of general configuration of an image storage and distribution system of circulation recording type according to this invention.

The image storage and distribution system comprises an image storage and distribution server 1 including a recording device (hereinafter referred to as the disk unit) for storing the image data (including the voice data), a plurality of Web cameras 5 (5-1 to 5-n) connected to the image storage and distribution server 1 through a network 4 and a plurality of client terminals 6 (6-1 to 6-m), where n and m are natural numbers and not necessarily equal to each other. For example, numeral number 5-1 designates a Web camera for channel 1 (CH1), numeral number 5-2 a Web camera for channel 2 (CH2) and numeral number 5-n a Web camera for channel n (CHn).

The Web cameras 5-1 to 5-n each have a specified channel number, compress each frame of a picked-up image by an image compression scheme such as JPEG and transmit the compressed image data to the image storage and distribution server 1 in the form of IP packets. The length of the compressed image data is variable from one frame to another. The image storage and distribution server 1 extracts the compressed image data (hereinafter referred to simply as the image data) from each packet received through the network from the Web cameras 5-1 to 5-n, and records (writes) them in the circulating recording areas 30 (30-1 to 30-n) secured for each channel in the disk unit 3.

Each client terminal 6 designates the channel number and the frame number (described later) and requests the image storage and distribution server 1 to distribute the image data corresponding to the designation. The image storage and distribution server 1, in response to the request from the client terminals 6-1 to 6-m, reads the image data of the designated channel and the designated frame number from the disk unit 3 or the latest image data from the cache memory and distributes them to the client terminal 6, as the requester, in the form of IP packet.

Figure 2:
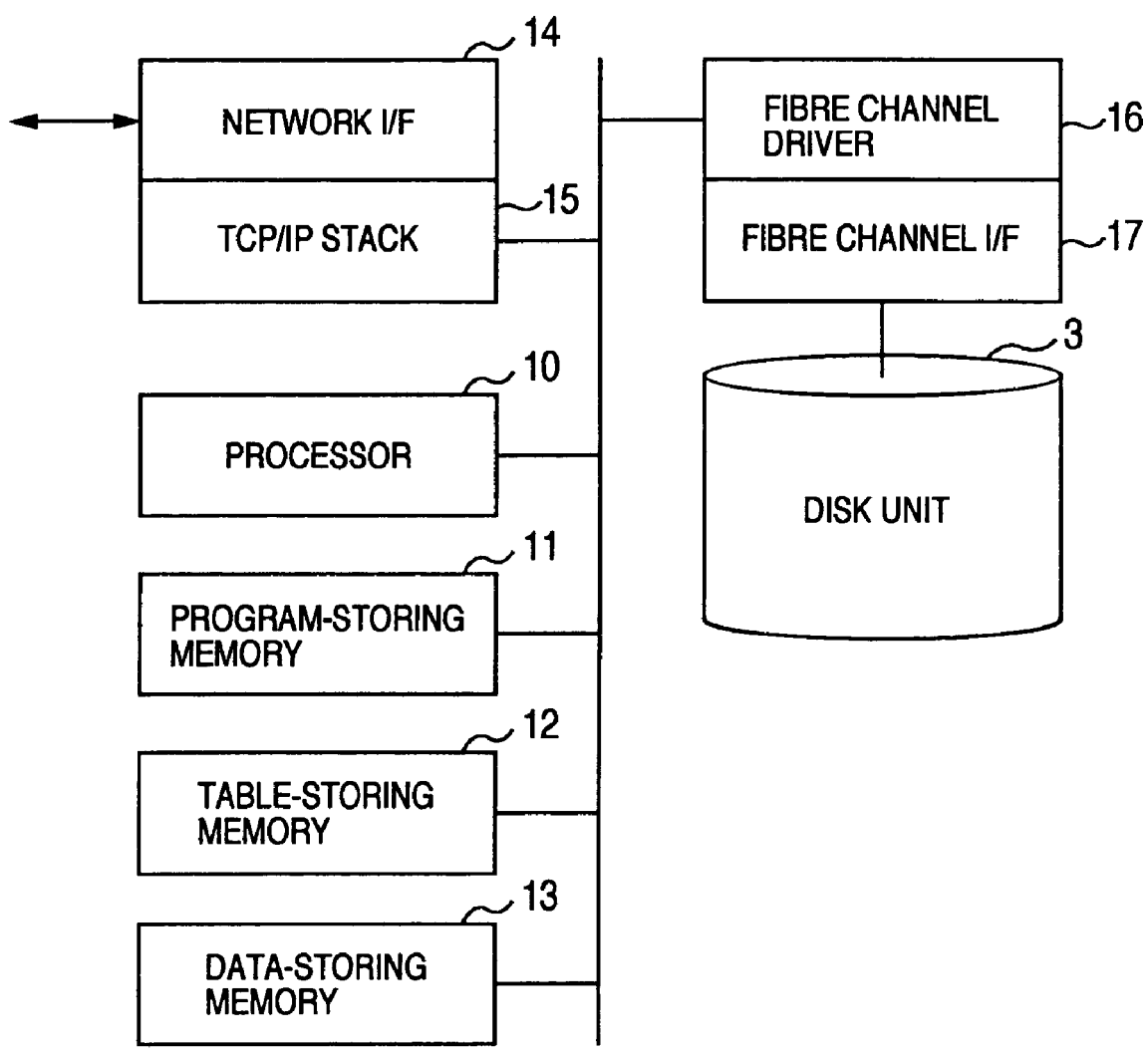
FIG. 2 is a block diagram showing an image storage and distribution server 1 according to an embodiment of the invention.

FIG. 2 is a block diagram showing the image storage and distribution server 1 according to an embodiment of the invention.

The image storage and distribution server 1 includes a processor 10, a program memory 11 for recording (storing) various programs executed by the processor 10, a table-storing memory 12 to form (store) various tables required for storing the image data by channel and distributing the image data to the clients, and a data-storing memory 13 used as a buffer area for the image frames to be transmitted/received and a cache area for the image data to be written/read. The image storage and distribution server 1 also includes a network interface 14 for connecting to the network 4, a TCP/IP stack 15, a fibre channel driver 16 constituting an interface for connecting to the disk unit 3 and a fibre channel interface 17.

Figure 3:
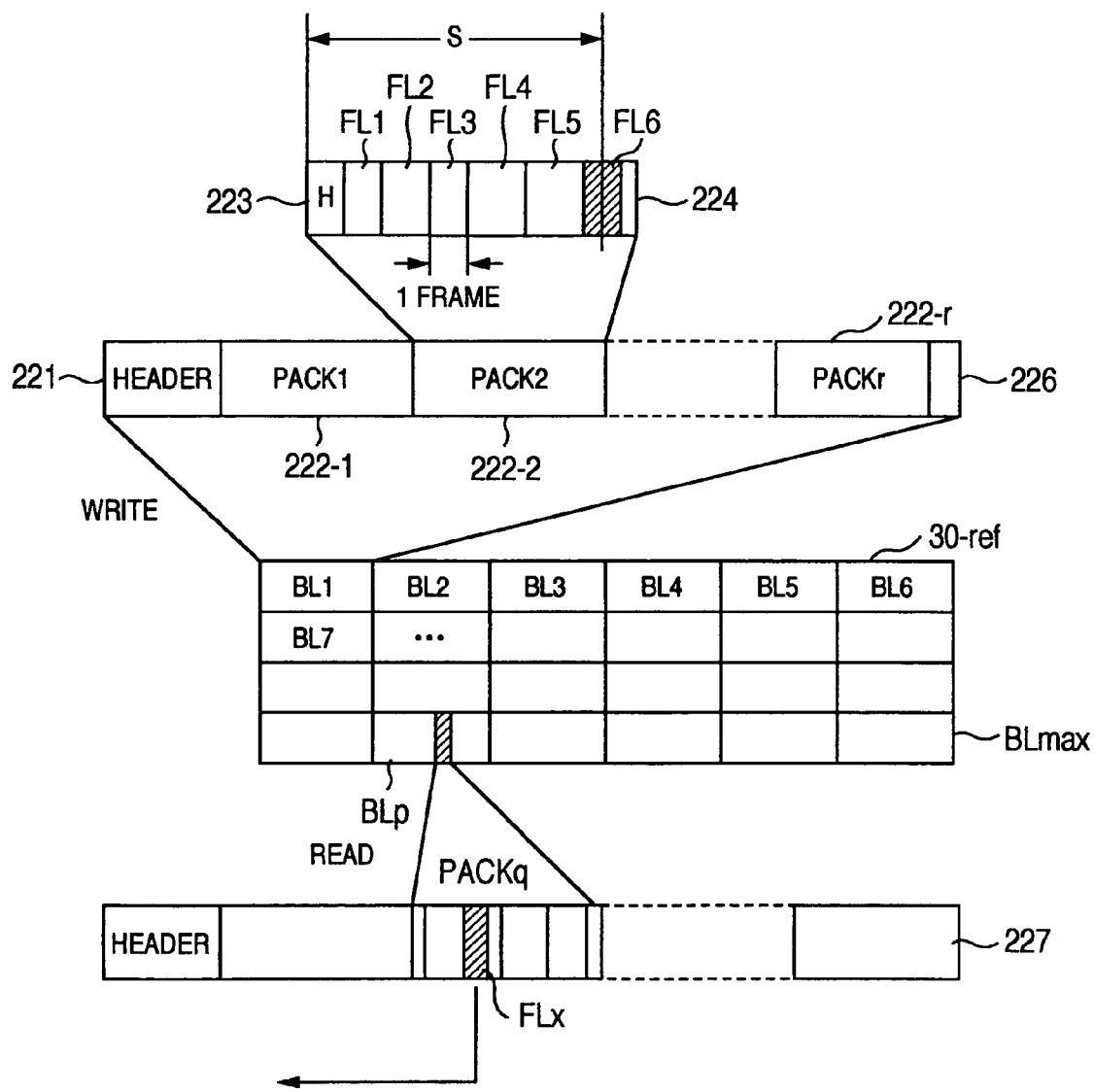
FIG. 3 is a diagram showing the operation of the image storage and distribution server 1 for writing and reading the image data into and from a disk unit.

FIG. 3 shows the operation of the image storage and distribution server 1 according to this invention to write and read the image data into and from the disk unit 3.

The hard disk of which an intended track is sought and accessed at the time of reading/writing the data has such a characteristic that the recording area can be accessed rapidly in a sequential access but less rapidly in a random access. For efficiently accessing the disk, the data transfer rate is desirably a multiple of the sector size of the disk unit 3. In view of this, according to this invention, the image data received by frame from the Web cameras are stored sequentially in cache memories by channel (the write cache area of the disk), and edited into data blocks as large as a multiple of the sector size, so that the data are written into the disk unit 3 by block.

Specifically, as shown in FIG. 3, the circulating recording area 30-ref defined by channel in the disk unit 3 is classified into a plurality of blocks BL1, BL2, BL3, BL4, BL5, BL6, BL7 to BLmax of fixed size. The image data are written by block sequentially, the starting block BL1 first, and upon complete writing of the image data into the last block BLmax, the next image data is written into the starting block BL1. In this way, the image data are recorded utilizing the memory area in circulation. The characters "ref" and "max" designate a natural number, and the relation holds that 1≦ref≦max.

The image data written by block in the circulating recording area 30-ref are formed into a disk write cache area 226 in each data-storing memory for each data block, and then written in the blocks BL1 to BLmax of the circulating recording area 30-ref. The disk write cache area 226 includes a header 221 and a plurality of variable-length subblocks 222 (222-1 to 222-r), where r is a natural number. These subblocks have recorded therein the image data of a plurality of the frames FL1, FL2, FL3 and so forth. In the description that follows, these subblocks are referred to as "packs". Each pack 222 has a length equal to an integer multiple of the sector size, and the starting position has set therein the position information indicating the frame starting position in bytes in the pack and, preferably, an in-pack header (H) 223 indicating the frame time information.

According to this embodiment, the image frames following the header (H) 223 are sequentially recorded (written) in the area equal to the basic size S of each pack 222. In the case where the last image frame (for example, FL6) exceeds the basic size S, a vacant area 224 is set in such a manner that the trailing end of the particular pack is located at a position corresponding to an integer multiple of the sector size. Therefore, the pack size is a variable length substantially equal to the basic size S. As an alternative method, in the case where the last image frame (for example, FL6) exceeds the basic size S, the image frame FL5 and subsequent image frames are set as a vacant area, and the last frame FL6 is recorded in the next pack. Using the packs configured of these frames, the blocks BL shown in FIG. 3 are formed. Each block has a predetermined length.

For reading the image data from the circulating recording area 30-ref, on the other hand, a first read mode (hereinafter referred to as the first mode) based on the pack including the frame designated by the client terminal or a second read mode (hereinafter referred to as the second mode) based on the data block including the designated frame is selectively used. This is by reason of the fact that in the case where the image is reproduced normally (one-time), slowly (less than one-time) or reversely at a client terminal, the second mode for reading the image data by block is more efficient, while in the case where random frames selected discontinuously at the client terminal are reproduced, on the other hand, many of the data read in the second mode become wasteful, resulting in a lower access efficiency.

In the first mode, for example, assume that a client terminal issues a request for an image frame FLx included in the block BLp. The image storage and distribution server 1 reads out the pack (PACKq) including the designated frame FLx from the circulating recording area 30-ref into the disk read cache area 227, and selecting the designated from FLx from the pax PACKq, distributes it to the client device as the requester.

In the case where a designated frame already exists in the disk read cache area 227, the image data is not required to be read from the circulating recording area 30-ref. In the case where a designated frame is stored in the disk write cache area 226, on the other hand, the image storage and distribution server 1 distributes the image frame read from the disk write cache area 226 to the client device as the requester.

In the case where the frame request from the client terminal presupposes a reproduction mode suitable for reading by block, the second mode instead of the first mode is selected, and the image data corresponding to one block including the designated frame is read out into the disk read cache area 227. In this case, the designated frames can be selected from the previously read image data blocks and sequentially distributed to the client terminal in response to subsequent transmitting requests.

Figure 4:
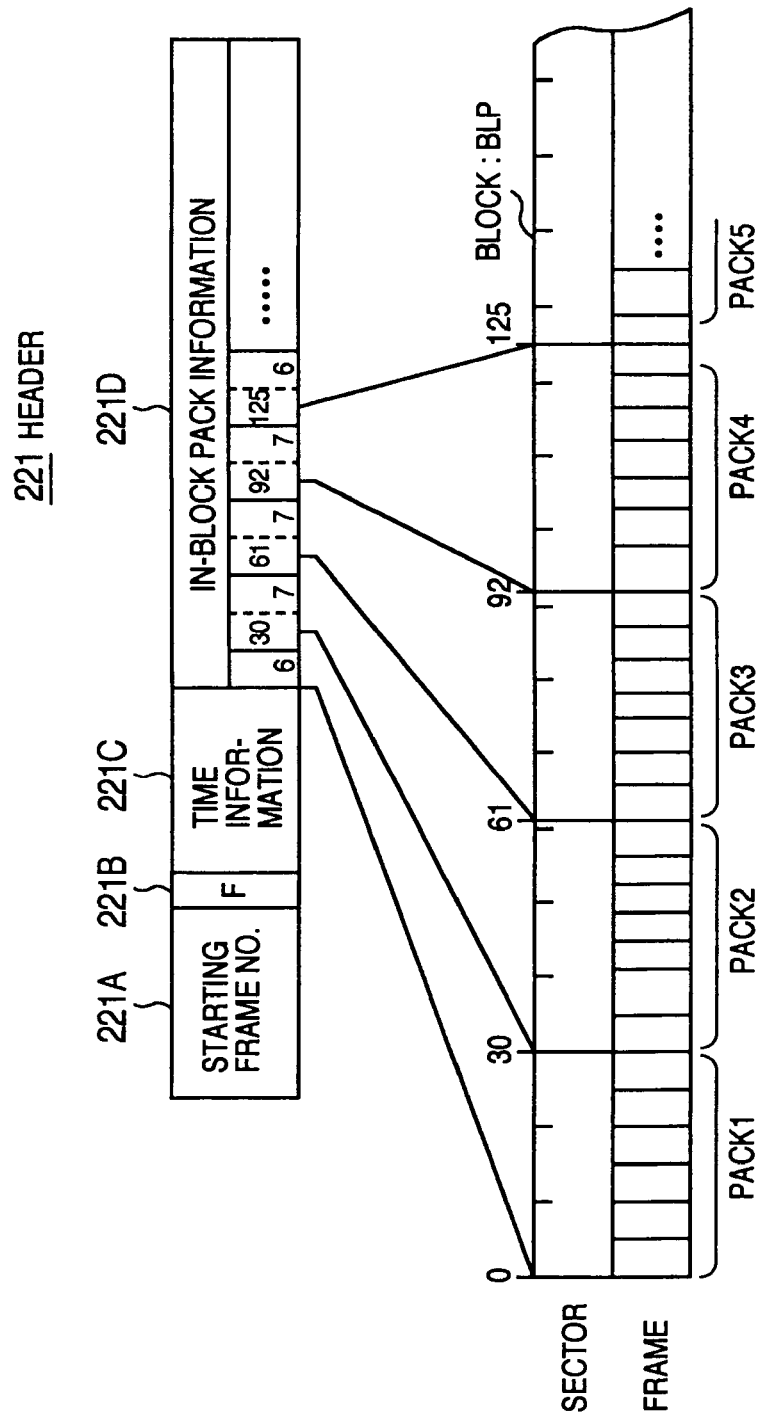
FIG. 4 is a diagram showing the relation between the detail of the header attached to the data block and the image data recorded in each block of the circulating recording area.

FIG. 4 shows the detail of the header 221 attached to each data block and the relation between the image data recorded in the block BL (say, block Btp, where p is a natural number satisfying the equation p≦max) of the circulating recording area and the data block.

The header 221 is formed of at least the frame number of the starting frame (starting frame number) included in the starting pack of the data block, a status flag 221B, time information 221C and in-block pack information 221D. The time information 221C sets into the starting frame in the data block.

The in-block pack information 221D includes a plurality of fields corresponding to a plurality of the packs making up the data block. The first field includes one value (configured of 8 bits, for example) and indicates the number of frames included in the starting pack of the data block. The second and subsequent fields are each configured of two values (the first value is configured of 8 bits, and the second value 8 bits, etc.). The first value indicates the address number of the starting sector of the pack, and the second value the number of frames in the pack. The number of fields made available in the in-block pack information 221D is limited, and therefore the number of packs included in each data block also has an upper limit.

Figure 5:
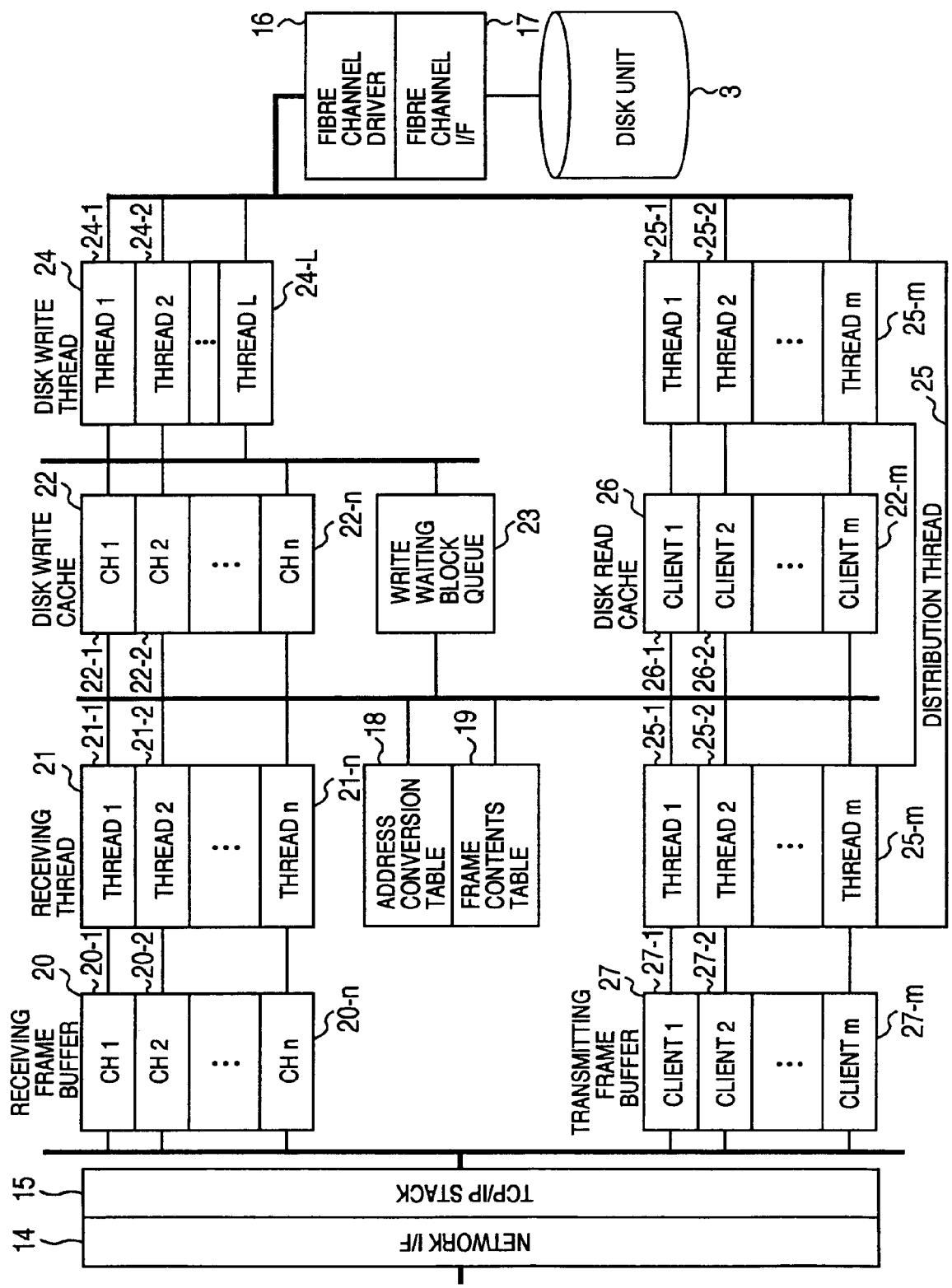
FIG. 5 is a block diagram showing the functions of the parts of the image storage and distribution server 1 for writing and recording the image data.

FIG. 5 is a functional block diagram showing that part of the image storage and distribution server 1 according to the invention which is related to the image data write/read operation described above.

According to this embodiment, the data-storing memory 13 (FIG. 2) is formed with a plurality of receiving frame buffers 20 (20-1 to 20-n) and disk write caches 22 (22-1 to 22-n) corresponding to the number n of the channels. Specifically, the receiving frame buffer 20 and the disk write cache 22 are formed for each of the channel numbers 1 to n. The data-storing memory 13 is also formed with a plurality of transmitting frame buffers 27 (27-1 to 27-m) and disk read caches 26 (26-1 to 26-m) corresponding to the number m of client terminals.

The image frame packets transmitted from the Web cameras 5 are received by the network interface 14, and with the image frame extracted by the TCP/IP stack 15, input to the receiving frame buffers 20 (20-1 to 20-n) corresponding to the channel numbers. The image frames input to the receiving frame buffer 20 are transferred to the disk write caches 22 (22-1 to 22-n) by the receiving threads (21-1 to 21-n) corresponding to the channel numbers, and formed as a data block like the disk write cache area 220 described with reference to FIG. 3.

The receiving thread 21 is a program in real terms for processing the received image frames prepared in the program memory 11. According to this embodiment, as described in detail with reference to FIG. 6, each disk write cache 22 corresponding to a channel is configured of a plurality of cache areas. Upon complete editing of a data block in a given cache area, the next data block is edited from subsequent receiving frames in another cache area. The data blocks thus edited are assigned sequential block numbers by channel.

After completing a given data block, each receiving thread 21 generates a control block indicating a channel number, a block number, an identifier of the cache area where the particular data block is located and the address of the destination of the data block in the disk unit 3 (hereinafter referred to as the disk address). This control block is registered in the write waiting queue 23. This write waiting queue 23 may be of FIFO (first-in first-out) type. The address conversion table 18 is for converting the channel number and the block number to the disk address. Thus, it is understood that no disk address (or no channel number or block number) may be included in the control block. Further, each receiving thread 21 stores in a frame contents table 19 the contents of the header 221 of FIG. 4 held by the completed data block.

The frame contents table 19 includes a plurality of tables (storage areas) by channel number. The contents of the header 221 are used as index information of the image frames held in the circulating recording area 30 corresponding to each channel. The index information entry stored in the frame contents table 19 corresponds to the data blocks held (stored) in the circulating recording area 30. Specifically, the video data produced are recorded in circulation (overwritten from the starting portion after arriving at the tail end of the storage area) in the storage areas secured by channel. The index information entry paired with the video data and used as a table of contents is also recorded (stored) in circulation in the area secured by channel in the frame contents table 19.

The disk write thread 24 (24-1 to 24-L, where L is a natural number not larger than n) is a program in real terms prepared in the program-storing memory 11 for processing the data block. The control block is retrieved from each write waiting block queue 23, and in accordance with the channel number and the cache area identifier indicated by the control block, one of the data blocks is read out from the disk write cache 22. Also, in accordance with the disk address indicated by the control block, the data block is written at a specified block position of a specified circulating recording area in the disk unit 3.

The distribution thread 25 (25-1 to 25-m) is also a program in real terms prepared in the program-storing memory 11 for processing the transmitting data. In response to an image frame distribution request from each client terminal 6 (6-1 to 6-m), the image data is read by pack or by block from the disk unit 3 into the disk read cache 26 according to the first or second mode on the one hand, and the designated image frame is transferred to the transmitting frame buffer 27 (27-1 to 27-m) on the other hand. The image frame input to the transmitting frame buffer 27 is converted into an IP packet by the TCP/IP stack 15 and transmitted to a network through the network interface 14.

Each client terminal 6 (6-1 to 6-m) requests the distribution of the image frame from the image storage and distribution server 1 by designating the channel number and the frame number. The distribution thread 25 accesses the frame contents table 19 and specifies the pack position and the number of the block including the image frame requested from the client, while at the same time specifying the disk address corresponding to the channel number and the block number from the address conversion table 18. The image data read operation in first mode is performed based on the disk address and the pack position, while the image data read operation in second mode is carried out based on the disk address.

Figure 6:
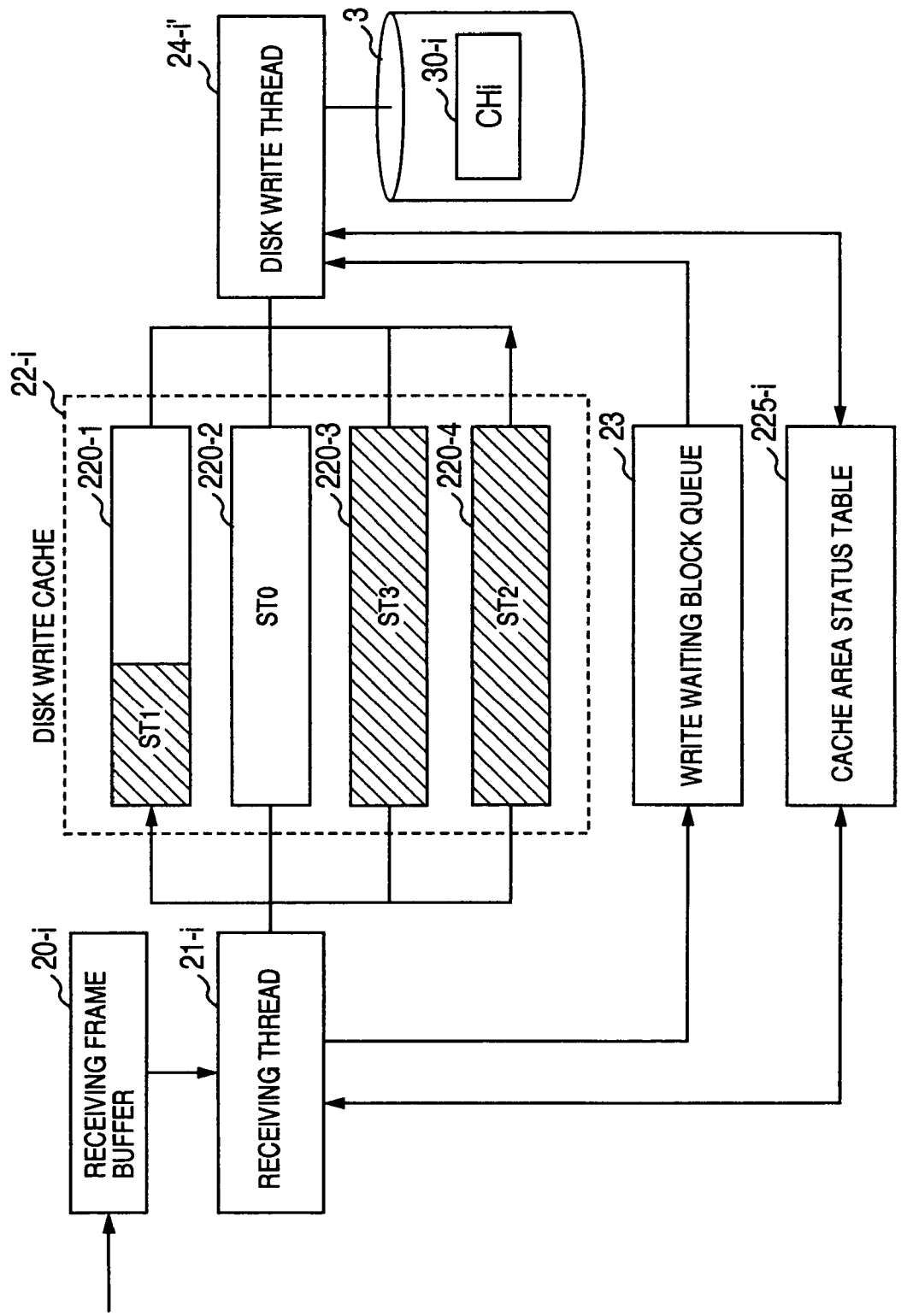
FIG. 6 is a diagram showing the operation of a receiving thread 21-i for editing the data blocks.

FIG. 6 shows the operation of editing the data block by the receiving thread 21-i for the i-th channel (channel i).

According to this embodiment, four cache areas 220-1 to 220-4 are made available as a disk write cache 22-i for the ith channel. The state of the cache area includes "vacant" (ST0), "editing" (ST1), "write waiting" (ST2) and "write complete" (ST3). The present state of each cache area is recorded in the cache area status table 225-i.

The receiving thread 21-i accesses the cache area status table 225-i and selects a vacant (ST0) cache area from the disk write cache 22-i. The cache area status code is changed to the editing status ST1, i.e. the state in which the particular cache area can be edited, after which the data block of the image frame is edited. In the case where there is no vacant (ST0) cache area, the cache area including the data block with the oldest time information 221C is selected from the cache area in the write complete state (ST3). This status code is changed to the editing state ST1, and then the data block is edited in the cache area.

The receiving thread 21-i, upon complete editing of one data block in the cache area, changes the status code of the particular cache area from ST1 to ST2 on the cache area status table 225-i. A control block for the cache area is generated and registered in the write waiting block queue 23.

The disk write thread 24-i' retrieves the starting control block from the write waiting block queue 23 (in the case where the write waiting block queue 23 is of FIFO type). In accordance with the control block, the data block of the cache area in the write waiting state (ST2) is read from the disk write cache 22-i. This data block is written in the ith-channel circulating recording area 30-i of the disk unit 3. After that, on the cache area status table 225-i, the status code of the cache area for which the write operation into the disk unit is complete is changed from ST2 to ST3, thereby finishing the writing process for one data block.

The time required for writing the data block by the disk write thread 24-i' is shorter than the time required for data block generation by the receiving thread 21-i. Therefore, the data blocks of all the channels of the disk write cache 22 can be written in the disk unit 3 by the disk write threads 24 (24-i to 24-L) in the number L smaller than the channel number n. According to this embodiment, the four cache areas 220-1 to 220-4 are made available for the disk write cache 22-i. Nevertheless, at least one cache area may be available for each channel, and the maximum number of cache areas may be arbitrary. Also, the minimum number of the cache areas for each channel may be set to 2 with double buffers. For example, one of the double buffers is used to fill the packs (frame data), and the other to wait for writing in the disk.

Figure 7:
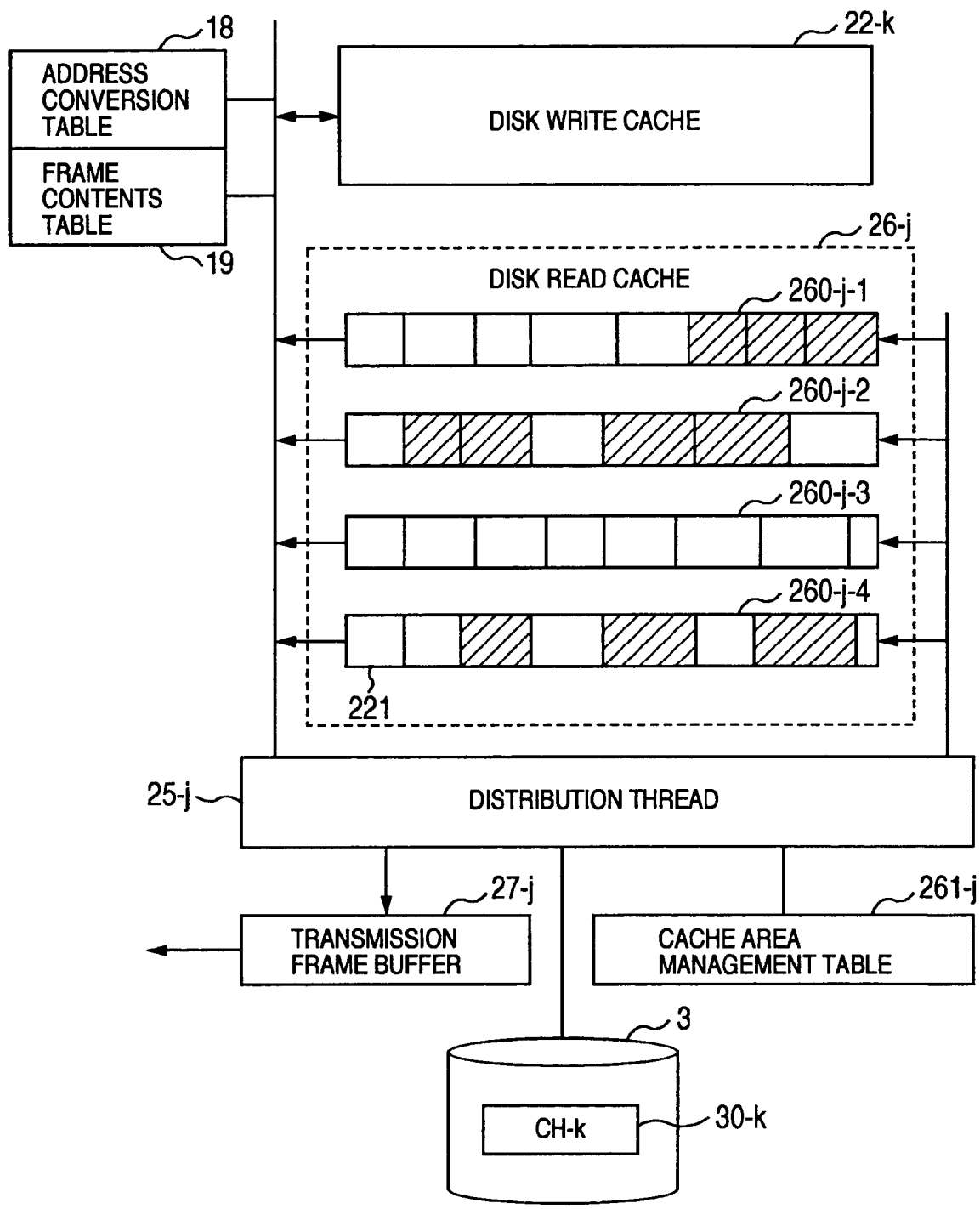
FIG. 7 is a diagram showing the operation of a distribution thread 25-j for reading the image data and distributing the image frame.

FIG. 7 shows the operation of reading the image data in first mode and distributing the image frame performed by the distribution thread 25-i in response to an image frame distribution request from the client terminal 6-j, where j is a natural number not more than m ($j \leq m$).

According to this embodiment, four cache areas 260-j-1 to 260-j-4 are made available as a disk read cache 26-i for the client terminal 6-j. Also, in order to determine the correspondence between each cache area and the image data block read into the particular cache area, the index information of the read data block obtained from the frame contents table and the last time of access to each cache memory area with a corresponding identifier of the cache area are registered in a cache area management table 261-j by the distribution thread 25-j.

The disk read cache 26-j, as shown in FIG. 7, has a plurality of cache areas 260-j-1 to 260-j-4 for each client terminal to read the image data for a plurality of blocks. In first mode, however, as indicated by hatching, the image data is read by pack sequentially from the pack required for each cache area. Even in the case where a cache area is already assigned to the data block associated with the required frame, therefore, the pack including the required frame is not necessarily existent in the cache area. Specifically, each of the four cache areas has information indicating a particular disk address of the data thereof. For example, assume that the cache 260-1 is assigned the data of the disk address 1000. In first mode, all the block sizes (cache sizes) are not read at a time, but only the required packs are read into the cache memory from the disk. The position on the cache memory where a pack is read is determined by the correspondence between the address on the cache memory and the address in the block. In the pack of 99 bytes from the 100th byte in the block, for example, the read operation starts with the 100th byte on the cache memory. In first mode, therefore, the desired pack data may not be existent on the cache even in the case where the cache 260-1 is assigned the disk address 1000.

The distribution thread 25-j, upon receipt of the image frame distribution request message from the client terminal 6-j, extracts the channel number k and the requested frame number x from the received message, where k is a natural number satisfying the relation $1 \leq k \leq n$. Next, in accordance with the channel number k and the requested frame number x, the frame contents table 19 is accessed thereby to determine whether the requested frame number is currently held in the circulating recording area 30-k or the disk write cache 22-k.

In the case where the requested frame number x is older than the oldest accessible frame number indicated in the frame contents table 19, the requested frame number is replaced by the oldest frame number. In the case where the requested frame number x is newer than the newest accessible frame number, on the contrary, the requested frame number is replaced with the newest frame number, followed by checking whether the requested frame is existent in the disk write cache 22-k or the disk read cache 26-j. Specifically, the circulating recording process may cause the already overwritten data to be accessed. Then, in the case where the number of the frame requested from the client is associated with the portion erased by overwriting (in other words, the portion older than the oldest frame number on the disk), the requested frame number is replaced with the oldest frame number on the disk to execute the process described above. In the case where the number of the frame designated as a request from the client is newer than the newest frame number held, on the other hand, the requested frame number is replaced by the newest frame number thus held to execute the process described above. For executing the process with the frame number replaced with the newest one, the write cache 22-K is searched for the data (in most cases, the data of the newest frame number exists on the write cache), and in the case where no such data is existent, the disk read cache is searched.

The presence or absence of the requested frame on the disk write cache 22-k is determined by checking the header 221 of each data block stored in the cache area. Also, the presence or absence of the requested frame in the disk read cache 26-j is determined from whether the data block including the requested frame is already assigned to any one of the cache areas 260-j-1 to 260-j-4, based on the index information registered in the cache area management table. In the case where the data block is already so assigned, the position of the pack containing the requested frame in the data block is specified from the in-block pack information 221D constituting part of the index information thereby to determine whether the pack data has been read at the specified position of the cache area.

In the case where the requested frame is existent in any of the caches described above, the distribution thread 25-j reads the image frame FLx of the requested frame number x from the cache and copies it to the frame buffer 27-j. In the case where the image frame FLx is read from the disk read cache 26-j, the distribution thread 25-j updates the value of the last access time of the cache area holding the data block registered in the cache area management table 261-j to the latest access time (present time).

Assume that the data block corresponding to the requested frame is already assigned to any one of the cache areas 260-j-1 to 260-j-4 and the pack containing the requested frame is yet to be read into the cache area. The distribution thread 25-j reads the pack containing the requested frame from the circulating recording area 30-k of the disk unit 3 corresponding to the channel number k and, after storing it in the corresponding position of the assigned cache area, copies the requested frame to the frame buffer 27-j. Also in this case, the value of the last access time of the cache area holding the data block registered in the cache area management table 261-j is updated to the latest access time.

In the case where the data block corresponding to the requested frame is existent in neither the write cache 22-k nor the read cache 26-j, the distribution thread 25-j finds an unused cache area from the read caches 26-j and, after clearing the particular cache area, assigns it to the data block read area of the requested frame thereby to read the pack containing the requested frame from the disk unit. In the absence of an unused cache area in the read cache 26-j, on the other hand, the distribution thread 25-j finds the cache area of the oldest last access time from the cache area management table 261-j. The particular cache area, after being cleared, is assigned to the data block read area of the requested frame thereby to read the pack containing the requested frame from the disk unit.

What is referred to as the assignment of the data block read area herein indicates the operation in which the index information of the new data block determined from the frame contents table 19 is registered with the corresponding identifier of the assigned cache area in the cache area management table 261-j, and the value of the last access time of the cache area is set as the newest (latest) access time.

With reference to FIG. 7, the first-mode operation for reading the image data by pack from the circulating recording area has been described. As already explained, in the case where the frame request from the client terminal presupposes the image reproduction at one-time speed or the reverse reproduction, the second mode for reading the image data by block is selected, and the image frames previously read by the read cache 26-j are distributed sequentially to the client terminal as the requester.

The operation mode of the client terminal may be expressly indicated by the image frame distribution request message from the client terminal 6-j. As an alternative, the operation mode may be estimated by the distribution thread 25-j comparing the previous requested frame number with the new requested frame number from the client terminal 6-j.

The remote monitor operation at the client terminal is often accompanied by a jump from the currently monitored screen to a screen retroactive by a predetermined time, and with this screen as a starting point, the one-time image reproduction or the reverse reproduction is often carried out. According to this invention, in the case where the requested frame jumps to a new screen, the image is read by pack in first mode, and at the end of sequential access to the frames in the pack, the next image is read in selected one of the first and second modes. In the case where the next pack is in vicinity of the end of the data block, the image is advantageously read by pack in first mode. At the position near to the starting or central portion of the data block, on the other hand, the data are read by block by switching to the second mode thereby to suppress the number of times the disk is accessed subsequently.

According to this embodiment, the first mode of reading for each pack including the frame designated by the client terminal and the second mode of reading for each data block including the designated frame are switched to each other according to the one-time speed image reproduction or the reverse reproduction on the part of the client. In the process, the one-time speed is only a measure and variable depending on the relation between the read rate by pack in first mode and the read rate by block in second mode of the disk unit 3. In the case where one block can be read faster than two packs in the same block, for example, the second mode is selected for the frame request from the client for the reproduction rate of not less than two packs in one block, while the first mode is selected for the reproduction rate of less than two packs in one block.

An example of the criterion for the first-mode read operation (read operation by pack) and the second-mode read operation (read operation by block) is explained below. Assuming that the image is reproduced by the client at the one-time rate sequentially using the frame data continuously, the read operation in second mode is carried out. This is because the data can be read more efficiently by block. In the case where the client requests intermittent data by rapid feed/return, the greater part of a block, if read, is not used and another block of a different block size is liable to be read. In this case, the read operation in first mode is more efficient. Thus, the present frame request number and the previous request number from the client are compared with each other, and in the case where the difference continues to be less than a predetermined number, the second mode is selected, while in the case where the difference continues to be more than the predetermined number, the first mode is selected.

According to this embodiment, the data block is edited by a plurality of distribution threads 25 corresponding to the channels, and the time series data are read from the disk unit by a plurality of the distribution threads corresponding to the client terminals. As an alternative, however, one receiving thread 21 may correspond to a plurality of channels, and one distribution thread 25 can handle a plurality of clients.

As apparent from the embodiments described above, according to this invention, the time series input data are edited into a data block of a predetermined size including a plurality of subblocks, and written in a disk unit by data block. In this way, the data is selectively read either by block or by subblock, and therefore there are provided a circulating recording apparatus and an image storage and distribution system with an improved disk access efficiency.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A circulating memory apparatus for recording each time series input video data in a circulating memory area for each channel secured in a disk of a recording device of the circulating memory apparatus, comprising:
   a buffer for receiving and buffering the each time series input video data for each channel;
   an editing unit for reading, from the buffer, a plurality of image frames of the time series input video data for the same one channel, making a subblock based on the read image frames, and editing a data block having a predetermined data size including a plurality of subblocks;
   a writing unit for writing said each time series input video data by data block into the circulating memory area for each channel in the disk of said recording device;
   a cache memory which includes a plurality of cache areas each of which corresponds to a specific image frame output request for outputting a specific image frame for a specific channel of the each time series input video data;
   an outputting unit for reading the time series input video data, by subblock, containing the specific image frame from the circulating memory area for the specific channel in the disk of said recording device in response to the specific data output request and for selectively outputting the specific image frame contained in a subblock of the subblocks; and
   a cache area management table, corresponding to each of the plurality of cache areas, for indicating information on the subblock outputted to the cache area and index information on the image frame,
   wherein the data block has a header portion and the plurality of subblocks and has a predetermined block data size equal to an integer multiple of a data size of a sector of the disk in said recording device,
   wherein the header portion of the data block has header information which indicates a frame number of a start image frame contained in the data block, a sector identifier indicating a start position of the subblock contained in the data block, and the number of the image frames contained in the data block,
   wherein the subblock includes an internal header portion and a data portion, the data portion follows the internal header portion and is configured to continuously pack the plurality of image frames,
   wherein the subblock further includes a data vacant portion which is arranged to follow a final image frame contained in the subblock and a length of the vacant portion is adjusted so that a data size of the subblock is equal to an integer multiple of the size of the sector of the disk in the recording device,
   wherein the outputting unit selectively executes a first reading mode or a second reading mode, the first reading mode is an operation for reading the video data, by subblock, from the memory area and outputting it, and the second reading mode is an operation for reading the video data, by data block, from the memory area and selectively outputting the specific image frame contained in the data block,
   wherein, in the first reading mode, based on the cache area management table, the outputting unit determines whether or not a target subblock of the subblocks which contains the specific image data which is requested by the specific data output request is stored in a specific cache area of the cache memory, and
   wherein if the target subblock is not stored in the specific cache area of the cache memory, then the outputting unit reads the subblock containing the specific image frame from the memory area of the specific channel to the specific cache area.

2. A circulating memory apparatus according to claim 1, wherein the writing unit writes said time series input data so as to physically form a series of continuous data on the disk in the recording device.

3. A circulating memory apparatus according to claim 1, wherein said data block includes another header portion, a plurality of subblocks and another vacant area, and
   wherein said data block has a length equal to an integer multiple of the size of a sector, and
   wherein each of said data blocks has a predetermined length.

4. A circulating memory apparatus according to claim 1, wherein said reading unit reads the data, by data block, from said recording device in response to sequential data output requests, if any, during a predetermined period of time.

5. A circulating memory apparatus according to claim 4, wherein said outputting unit reads the data sequentially from said recording device with the required subblock first.

6. A circulating memory apparatus according to claim 1, wherein said writing unit further includes a write cache memory for storing the time series input video data and editing said time series data into a data block of said predetermined size, and
   wherein said reading unit reads the data by subblock from said recording device in the absence of target data in said cache memory and said write cache memory.

7. A circulating memory apparatus according to claim 6, wherein said outputting unit, upon determination that the requested data is not existent in said cache memory and said write cache memory, outputs data most nearest to said requested data.

8. The circulating memory apparatus according to claim 1, further comprising:
   a frame index table for storing the header information of the data block as image frame index information in coordination with the data block for each channel.

9. An image storage and distribution system connected to at least one image pickup device and at least one client device through a network, comprising:
   a recording device having at least one circulating memory area for storing each time series input video data for each channel in correspondence with a channel number assigned to said image pickup device;
   an editing for reading, from the buffer, a plurality of image frames of the time series input video data for the same one channel, making a subblock based on the read image frames, and editing a data block having a predetermined data size having a plurality of subblocks;
   a writing unit for writing said each time series input video data of said image frames by data block into the circulating memory area for each channel corresponding to the channel number of each image pickup device;
   a cache memory which includes a plurality of cache areas each of which corresponds to a specific image frame output request for outputting a specific image frame for a specific channel of the each time series input video data;
   an outputting unit for reading the time series input video, by subblock, containing the specific image frame from the circulating memory area for the specific channel in the disk of said recording device in response to the specific data output request and for selectively outputting the specific image frame contained in a subblock of the subblocks, and
   a cache area management table, corresponding to each of the plurality of cache areas, for indicating information on the subblock outputted to the cache area and index information on the image frame,
   wherein the data block has a header portion and the plurality of subblocks and has a predetermined block data size equal to an integer multiple of a data size of a sector of the disk in said recording device,
   wherein the header portion of the data block has header information which indicates a frame number of a start image frame contained in the data block, a sector identifier indicating a start position of the subblock contained in the data block, and the number of the image frames contained in the data block,
   wherein the subblock includes an internal header portion and a data portion, the data portion follows the internal header portion and is configured to continuously pack the plurality of image frames,
   wherein the subblock further includes a data vacant portion which is arranged to follow a final image frame contained in the subblock and a length of the vacant portion is adjusted so that a data size of the subblock is equal to an integer multiple of the size of the sector of the disk in the recording device,
   wherein the outputting unit selectively executes a first reading mode or a second reading mode, the first reading mode is an operation for reading the video data, by subblock, from the memory area and outputting it, and the second reading mode is an operation for reading the video data, by data block, from the memory area and selectively outputting the specific image frame contained in the data block,
   wherein, in the first reading mode, based on the cache area management table, the outputting unit determines whether or not a target subblock of the subblocks which contains the specific image data which is requested by the specific data output request is stored in a specific cache area of the cache memory, and
   wherein if the target subblock is not stored in the specific cache area of the cache memory, then the outputting unit reads the subblock containing the specific image frame from the memory area of the specific channel to the specific cache area.

10. An image storage and distribution system according to claim 9, wherein said outputting unit selects one of the mode for reading the time series input video data, by subblock, including the requested image frame and the mode for reading the image by the data block including said requested image frame in response to the image reproduction mode in a client device, and reading the time series input video data into the cache memory area from said circulating memory area.

11. An image storage and distribution system according to claim 9, wherein said writing unit has at least one write cache memory area for storing the image frames received in time series from each of said image pickup devices and editing said image frames into a data block of a predetermined size, and
   wherein said outputting unit reads the image data from said recording device in the absence of the requested image frame in said cache memory area and said write cache memory area.

* * * * *